United States Patent
Leitch et al.

(10) Patent No.: US 11,255,088 B2
(45) Date of Patent: Feb. 22, 2022

(54) METHOD OF EXTRUDING POLYMER FILM ONTO A MAT AND PRODUCTS INCORPORATING THE RESULTING COMPOSITE MAT

(71) Applicant: Building Materials Investment Corporation, Dallas, TX (US)

(72) Inventors: Olan T. Leitch, Bakersfield, CA (US); Mark Logan Keaten, Waxahachie, TX (US); Matti Kiik, Richardson, TX (US)

(73) Assignee: Building Materials Investment Coporation, Dallas, TX (US)

( * ) Notice: Subject to any disclaimer, the term of this patent is extended or adjusted under 35 U.S.C. 154(b) by 0 days.

(21) Appl. No.: 15/211,633

(22) Filed: Jul. 15, 2016

(65) Prior Publication Data
US 2017/0015042 A1   Jan. 19, 2017

Related U.S. Application Data

(60) Provisional application No. 62/278,155, filed on Jan. 13, 2016, provisional application No. 62/194,025, filed on Jul. 17, 2015.

(51) Int. Cl.
*B29C 48/08* (2019.01)
*B29C 48/155* (2019.01)
(Continued)

(52) U.S. Cl.
CPC .............. *E04D 1/20* (2013.01); *E04B 1/625* (2013.01); *B29C 48/08* (2019.02); *B29C 48/155* (2019.02);
(Continued)

(58) Field of Classification Search
CPC .......... E04D 1/20; E04B 1/625; B29C 47/026
See application file for complete search history.

(56) References Cited

U.S. PATENT DOCUMENTS 3,339,234 A * 9/1967 Utz ..................... B29C 47/0047
156/244.14
3,370,793 A * 2/1968 Chilcote ............. B29C 47/0021
156/244.11

(Continued)

OTHER PUBLICATIONS

Merriam-Webster, Jul. 26, 2018, p. 3 (Year: 2018).*

*Primary Examiner* — Jacob T Minskey
*Assistant Examiner* — Caroline Beha
(74) *Attorney, Agent, or Firm* — Womble Bond Dickinson (US) LLP

(57) ABSTRACT

A method of fabricating a polymer coated mat is disclosed to form a moisture barrier. The method includes moving a substrate mat along a processing path and heating the substrate mat to a predetermined temperature. A curtain of molten polymer is extruded through a slot die onto a surface of the heated substrate mat as the mat moves along the processing path to create a composite mat comprising a thin polymer film coating on at least one side of the substrate mat. The composite mat is then cooled in a controlled manner to cure and solidify the polymer film. The resulting composite mat may be used as a construction wrap, or it may be incorporated into other products such as an underlayment. A novel asphalt shingle may be fabricated using the composite mat in lieu of a traditional asphalt saturated mat or other substrate.

12 Claims, 2 Drawing Sheets

(51) Int. Cl.
   *B29C 48/21*   (2019.01)
   *E04D 1/20*   (2006.01)
   *E04B 1/62*   (2006.01)
   *B29L 31/10*   (2006.01)

(52) U.S. Cl.
   CPC ......... *B29C 48/21* (2019.02); *B29L 2031/108* (2013.01)

(56) References Cited

U.S. PATENT DOCUMENTS

| | | | | |
|---|---|---|---|---|
| 3,694,119 | A * | 9/1972 | Scheibling | B29C 47/065 264/173.12 |
| 3,825,380 | A * | 7/1974 | Harding | D01D 5/0985 425/72.2 |
| 4,345,959 | A * | 8/1982 | Asai | B29C 48/92 156/244.11 |
| 4,395,459 | A * | 7/1983 | Herschdorfer | B29C 70/506 428/391 |
| 4,614,679 | A * | 9/1986 | Farrington, Jr | A47L 23/266 428/138 |
| 5,096,645 | A * | 3/1992 | Fink | B29C 70/50 264/137 |
| 5,902,683 | A | 5/1999 | Sieloff | |
| 6,106,900 | A * | 8/2000 | Innes | B05C 5/0254 118/411 |
| 6,228,785 | B1 | 5/2001 | Miller et al. | |
| 6,248,199 | B1 * | 6/2001 | Smulson | B32B 37/153 156/244.12 |
| 6,341,462 | B2 | 1/2002 | Kiik et al. | |
| 6,564,682 | B1 | 2/2003 | Leavell | |
| 6,546,688 | B1 | 4/2003 | Parsons | |
| 6,709,994 | B2 | 3/2004 | Miller et al. | |
| 6,808,785 | B1 | 10/2004 | Friedman et al. | |
| 6,864,195 | B2 | 3/2005 | Peng | |
| 7,048,990 | B2 | 5/2006 | Koschitzky | |
| 7,070,843 | B2 | 7/2006 | Bartek et al. | |
| 7,070,844 | B2 | 7/2006 | Bartek | |
| 7,140,153 | B1 | 11/2006 | Humphreys et al. | |
| 7,442,270 | B2 * | 10/2008 | Bartek | B32B 11/04 156/278 |
| 7,442,658 | B2 | 10/2008 | Rodrigues et al. | |
| 7,670,668 | B2 | 3/2010 | Greaves et al. | |
| 7,851,051 | B2 | 12/2010 | DeJarnette et al. | |
| 8,226,790 | B2 | 7/2012 | Rodrigues et al. | |
| 8,266,861 | B2 | 9/2012 | Koch et al. | |
| 8,277,881 | B2 | 10/2012 | Khan et al. | |
| 8,309,169 | B2 | 11/2012 | Teng et al. | |
| 8,333,040 | B2 | 12/2012 | Shiao et al. | |
| 8,389,103 | B2 | 3/2013 | Kiik et al. | |
| 8,557,366 | B2 | 10/2013 | Harrington, Jr. et al. | |
| 8,826,607 | B2 | 9/2014 | Shiao et al. | |
| 2002/0166637 | A1 * | 11/2002 | Kobayashi | B29C 47/0066 156/555 |
| 2003/0188503 | A1 | 10/2003 | Parsons | |
| 2004/0014385 | A1 | 1/2004 | Greaves, Jr. et al. | |
| 2004/0071916 | A1 * | 4/2004 | Romanowski | B32B 27/12 428/40.1 |
| 2004/0081789 | A1 | 4/2004 | Kim | |
| 2005/0210808 | A1 | 9/2005 | Larson et al. | |
| 2009/0223155 | A1 * | 9/2009 | Perry | E04D 12/002 52/309.1 |
| 2009/0260309 | A1 | 10/2009 | Humphreys et al. | |
| 2010/0005745 | A1 | 1/2010 | Harrington, Jr. | |
| 2010/0212235 | A1 | 8/2010 | Barrego | |
| 2011/0017278 | A1 | 1/2011 | Kalkanoglu et al. | |
| 2011/0104461 | A1 | 5/2011 | Grubka | |
| 2011/0232220 | A1 | 9/2011 | Belt et al. | |
| 2014/0259820 | A1 | 9/2014 | Humphreys et al. | |

* cited by examiner

METHOD OF EXTRUDING POLYMER FILM ONTO A MAT AND PRODUCTS INCORPORATING THE RESULTING COMPOSITE MAT

REFERENCE TO RELATED APPLICATION

Priority is hereby claimed to the filing date of U.S. provisional patent application No. 62/194,025 filed on Jul. 17, 2015 and entitled Process for In-Line Extrusion of Coatings onto Roofing Shingles and Roofing Shingles Made By the Process, and to the filing date of U.S. provisional patent application No. 62/278,155 filed on Jan. 13, 2016 and entitled Method of Extruding Polymer Film Onto a Mat and Products Incorporating the Resulting Composite Mat.

TECHNICAL FIELD

This invention relates generally to construction products and the manufacturing of same, and more specifically to moisture resistant membranes used in construction products such as construction wraps, roofing underlayment, and shingles.

BACKGROUND

In the construction industry, there are many uses for thin sheets or webs of material that can serve as a moisture barrier. Such moisture barriers may be used, for example, as house wrap, roofing underlayment, wrapping material, or it may be incorporated into other products such as roofing shingles. Many types of material have been used over the years as moisture barriers. For example, common roofing felt may be used as a roofing underlayment. Roofing felt generally comprises a mat made of non-woven organic fibers saturated with a bituminous material such as asphalt. Moisture barriers for low slope roofs and commercial buildings may comprise a web of polymeric material such as TPO. More recently, products such as house wrap and roofing underlayment have been formed of a substrate material, which may be a non-woven glass mat material, which is saturated with or bonded to a film of polymer that forms a moisture barrier. These types of moisture barriers have become more ubiquitous over the years.

With regard to the application of films to webs of substrate material, the prior art suggests continuously withdrawing a sheet of pre-extruded film from a prefabricated roll and merging the film with a moving web of shingle material as the web and the film are conveyed in a downstream processing direction. This works. However, certain problems are inherent in such a technique. For instance, in order for a pre-extruded film to be rolled onto a roll for use, the film must be strong enough to resist tearing, folding, sticking to itself, and other damage. Such damage can occur during the rolling process and during the process of applying the film to a web of substrate material.

The thickness of a polymeric film has to be sufficient to meet the strength and rigidity requirements. It has been found that a polymer film having a thickness of greater than about 12 microns is required. However, such thicknesses often are significantly greater than is necessary to provide the moisture resistance and other desired properties to webs. It has been found that a polymer film thickness on a substrate between about 5 and about 10 microns is sufficient to form a robust moisture barrier, but this is too then to be applied from a pre-extruded roll of film. Thus, a thicker film than is necessary must be applied, thus increasing the volume of polymeric film material and manufacturing costs. Also, the sourcing, storage, and manipulation of large rolls of pre-extruded polymeric film add extra complication and cost. Further, just as with rolls of substrate material, rolls of film must be monitored during manufacturing and mechanisms must be provided to replace rolls as they become empty without having to stop the manufacturing line.

A need exists for a method of applying films and other coatings to a moving web of substrate material during the manufacturing process that addresses and resolves the above and other problems and shortcomings inherent in traditional prior art methods. It is to the provision of such a method, and of construction products such as shingles produced by the method, that the present invention is primarily directed.

SUMMARY

Briefly described, a method of fabricating a polymer coated substrate mat for use as or in construction products is disclosed. The method includes moving a non-woven mat of substrate material along a processing path and heating the mat to a predetermined temperature. A thin curtain of molten polymer is then extruded through a slot die onto a surface of the heated mat as the mat moves along the processing path. This creates a composite mat comprising a very thin polymer film coating on at least one side of the non-woven mat. The combined mat and polymer film coating is then cooled to obtain a unitary bond between the polymer film and the mat.

The resulting composite mat may be used as a moisture barrier such as a construction wrap or a roofing underlayment, or it may be incorporated into other products. For example, a novel asphalt shingle may be fabricated using the composite mat in lieu of a traditional asphalt saturated substrate. Extremely thin polymer films of 5 microns or less may be applied using the method of this invention. Such small thicknesses are sufficient to form a moisture barrier, but are not possible with traditional techniques involving applying pre-extruded films from rolls. Accordingly, the problems and shortcomings of the prior art are met.

These and other aspects, features, and advantages of the methods and products of the present invention will become more apparent upon review of the detailed description set forth below when taken in conjunction with the accompanying drawing figures, which are briefly described as follows.

DETAILED DESCRIPTION

Figure 1:
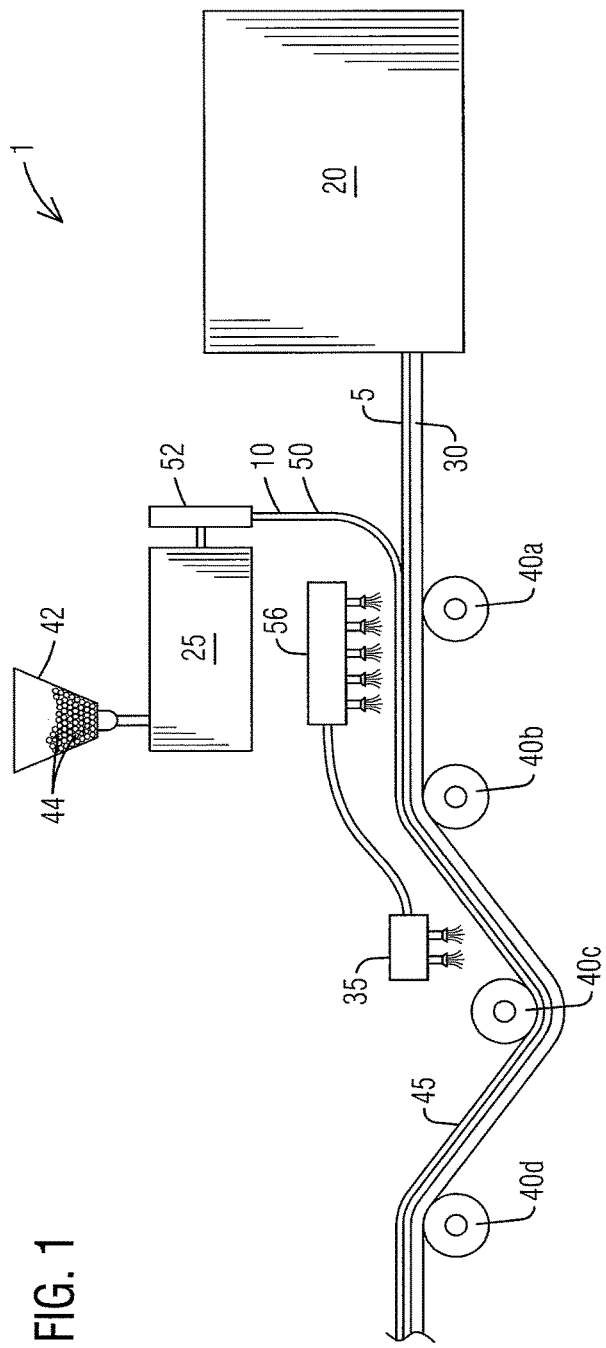
FIG. 1 illustrates the system of the present disclosure.

Reference will be made in this section to the drawing figures, wherein like reference numerals are used where appropriate for like parts throughout the several views.

Although various exemplary embodiments are discussed in detail below, it should be appreciated that these embodiments are not intended to illustrate all possible embodiments of the inventive concepts. The disclosed embodiments are intended as merely illustrative, and do not limit the scope of the invention that they illustrate.

Reference to the drawings is for illustrative purposes only and is not meant to limit the scope of the invention. The drawing figures are not necessarily to scale and certain features may be shown exaggerated in scale or in somewhat generalized or schematic form in the interest of clarity and conciseness.

Referring to the stylized representation of FIG. 1, a system 1 is depicted for extruding a thin polymer film unto a moving substrate mat 5. The substrate mat may in one embodiment be a non-woven fiberglass mat. The extrusion of the polymer film takes place while the mat is still hot and while the mat is moving along a processing path as part of a production process. The resulting composite mat is moisture resistant and can be used as a construction product or incorporated into construction products.

A preferred system for carrying out the method of the invention includes an oven 20, an extruder 25, a conveyor 30, and a substrate mat 5 that is conveyed by the conveyor through the oven 20 and along a processing path from right to left in FIG. 1. The extruder 25 is configured to extrude a thin layer of molten polymer onto at least one surface of the substrate mat 5 with the layer being substantially thinner than is possible with traditional mechanical application techniques. The substrate mat 5 with its extruded-on polymer film forms a composite mat 45. The composite mat 45 is passed by and around an array of chilled air blowers 35 and chilled rollers 40a-40d for cooling the composite mat 45 and curing the polymer film, which results in a unitary bond between the substrate mat 5 and the polymer film material. The film forms a moisture barrier that prevents the migration of moisture through the composite mat.

The substrate mat 5 in one preferred embodiment is a porous nonwoven fiberglass mat of the type traditionally used as a substrate in the manufacture of asphalt shingles. However, mats of other substrate materials and constructions such as mats made of organic cellulosic fibers may be used. The terms "substrate mat" and "mat" as used herein is intended to include and encompass a web, sheet, or mat of any appropriate construction and material for an intended use.

According to one preferred process, a mat precursor is paid out from a roll (not shown) and conveyed through the oven 20, wherein the mat precursor is heated to a temperature between about 220° F. and about 260° F. At these temperatures, the various binders in the mat precursor are heated and cured to fuse the fibers of the mat precursor together to form the mat 5. The fibers can be woven or non-woven as needed to suit a particular end use and may be organic or non-organic. The resulting mat 5, still hot from having passed through the oven 20, leaves the oven and continues to be conveyed in a downstream direction along the processing path.

Downstream of the oven 20, a polymer extrusion system is configured to extrude a thin film of molten polymer onto the hot moving mat 6. The extrusion system includes an extruder 25 and a polymer hopper 42 in which a polymer source, typically in the form of pellets 44, is contained for delivery to the extruder 25. In the extruder 25, the polymer is heated by shear forces and friction as it is conveyed by the screws of the extruder until the polymer assumes a molten or semi-molten state. The molten polymer is then forced under pressure through an extrusion die 52.

Preferably, the extrusion die 25 takes the form of a "slot die" having a narrow downwardly facing slot along its length through which molten polymer is ejected in the form of a thin curtain 50. The curtain 50 of molten polymer is deposited from the extrusion die directly onto the moving hot mat 5 below. Preferably, the extrusion occurs before the mat 5 has cooled after leaving the oven 20. In this way, a strong bond is formed between the molten polymer and the still hot mat so that when they are cooled, the two form a substantially monolithic or unitary structure.

The extruder ejects the molten polymer in the form of a continuous molten polymer curtain 50, which may be applied across the width of the still hot mat 5. This forms a film of a predetermined thickness on a side of the mat 5 as the mat 5 is conveyed past the die. The rate at which the polymer is extruded from the die may be adjusted relative to the line speed at which the mat 5 is conveyed past the extruder outlet 52. The combination of the extrusion rate and the line speed determines the thickness of the polymer film coating 10 applied to the hot mat 5. The molten polymer bonds to the hot surface of the mat to form a moisture barrier covering the surface of the mat. If desired, a polymer film may be extruded onto both surfaces of the mat 5.

As an example, the mat 5 may be conveyed past the extruder at a speed in the range of 1,400-1,900 feet per minute (ft/min). According to a particular embodiment, the mat 5 is heated in the oven 20 so that it is at about 250° F. when it passes the die 52 and the mat 5 is conveyed at a line speed of about 1,700 ft/min. However, it will be apparent that other suitable processing temperatures and speeds can be used where desirable and the scope of the invention is not limited to the exemplary embodiments. As one example, without limitation, the conveyed mat 5 has a width of about four meters and, as such, the polymer curtain 50 from the die also may be about four meters wide. Alternatively, the polymer film may be applied only at selected locations across the mat 5 to form strips that are waterproof if a particular application calls for such a configuration.

Preferably, the extrusion rate and the line speed are coordinated so that the extruded polymer curtain 50 forms a polymer film 10 on a surface of the mat 5 that is from about 2 microns to about 150 microns thick. According to a particular embodiment for forming a moisture barrier, the polymer forms a film 10 that is about 5-6 microns thick. It will be apparent that other thicknesses can be achieved as desired without departing from the scope of the invention exemplified by this example. For instance, significantly thicker films may be applied if the goal is to provide a property or properties in addition to a simple moisture barrier. These might include, for instance, increased rigidity, better impact resistance, or other properties.

When forming a simple moisture barrier, the thickness of the polymer film formed on the mat 5 is substantially less than is possible in the traditional technique of applying a pre-extruded polymer sheet to a mat with adhesive. This is at least in part because a pre-extruded polymer sheet must be thick enough to be structurally stable during rolling, shipping, handling, unrolling, and application to the mat. This imposes a minimum thickness of about 12 microns, which is significantly greater than the 2-10 microns possible with the extrusion methodology of the present invention. These thicker films are not necessary to form a moisture barrier, but they nevertheless add cost and weight to the finished composite mat. The additional cost of pre-extruding the polymer sheet, shipping it in rolls to a manufacturing facility, storing the rolls, and handling them during application can be substantial. The present invention eliminates all of these steps Once the polymer film 10 is applied, a composite mat 45 is formed that is still hot and the polymer is still at least partially molten and malleable. The hot composite mat 45 is conveyed through a series of cooling stations configured to cool the composite mat without deforming the malleable polymer film. In the illustrated embodiment, the cooling stations include a series of chilled rolls 40a-40d and chilled air blowers 35. Conditions at the cooling stations, including the temperature and volume of chilled air and the temperature of the chilled rolls, is controlled to chill the composite mat 45 as quickly as possible without compromising the integrity of the bond between the film and the mat and without distorting the polymer film.

In the illustrated embodiment, the composite mat 45 may first pass over an upstream chilled roller 40a located proximate the extruder outlet 52, which begins to cure and set the polymer film 10 by cooling the composite mat 45 immediately after the hot polymer is extruded onto the hot mat. A first chilled air blower 56 is located just downstream of the upstream chilled roller 40a above the composite mat and is configured to blow chilled air directly onto the polymer film from above. The upstream chilled roller 40a and the first chilled air blower 56 begin to cure and solidify the polymer film 10 and cool the composite mat 45. The composite mat may then be subjected to chilled air from a chilled air blower 35 downstream of the blower 56 to continue the cooling and solidification process.

The now somewhat cool composite mat 45 may then pass over a second chilled roller 40b. The second chilled roller 40b further cools the composite mat and functions to direct the composite mat to a third chilled roller 40c under which the composite mat passes to contact and cool the polymer film directly. A third chilled air blower 35 may be positioned to blow chilled air from above onto the composite mat just before the mat passes under the third chilled roller 40c. The third blower 35 may blow chilled air at a higher velocity onto the composite mat since the polymer film is by now sufficiently solidified and unmalleable to resist being deformed by the higher velocity air stream.

When the composite mat passes under the third chilled roller 40c, the polymer film is sufficiently solidified so that it does not stick to the surface of the roller 40c. The composite mat may further be directed over a fourth chilled roller 40 to complete the cooling and solidification of the composite mat. Of course, other configurations of chilled air blowers and chilled rollers 40, other cooling sequences, and other mechanisms can be used to cool the composite mat and cure the polymer film without departing from the scope of the invention. The invention is intended to encompass any mechanisms and techniques for cooling the composite mat after the molten polymer film is extruded onto the hot mat.

In one example, the chill sequence cools the composite mat 45 to near ambient temperature within about 50 feet from the location where the polymer film is extruded onto the mat. Sufficient cooling of the composite mat 45 ensures that the polymer film 10 does not stick when the composite mat 45 is wound onto rolls for transportation. Other suitable distances from the application of film 10 for ensuring the film 10 does not stick when the mat 45 is rolled will be apparent to one of ordinary skill in the art, and will be at least partially dependent on the processing speed and heat of the system 1.

The method and apparatus of the present invention results in significant advances over conventional techniques such as applying a pre-extruded polymer sheet onto a mat and bonding them together with adhesive or heat. A substantially thinner polymer film can be formed on the mat 5 using the methodology of this invention since the polymer film does not have to be thick enough to provide its own strength and rigidity prior to application. Thus, a surface of the mat 5 may be sealed to form a moisture barrier using a significantly thinner film layer 10 than is possible using conventional means. Significant savings of polymer material can thus be achieved, and the need to transport, store, and handle large rolls of pre-extruded polymer film is eliminated. As mentioned, however, films of much greater thickness up to about 150 microns can be applied using the extrusion method of this invention where additional properties provided by thicker films is desired.

Polymer film thicknesses of between about 2 microns and about 150 microns are achievable with the direct extrusion technology of the present invention. According to a particular embodiment, the polymer film coating 10 has a thickness of about 5-6 microns, which is sufficient to form a simple moisture barrier. By adjusting the output of the extruder 25 and the line speed of the mat conveyor 30, different thicknesses of film 10 on the mat are produced.

In conventional systems using pre-extruded films, a minimum polymer film thickness of about 12 microns is required for polymer films that are pre-extruded and transported on rolls before use. This is about the thickness of common plastic wrap or "cling wrap" used to wrap food and the like. Thinner pre-extruded polymer films do not have sufficient physical support and strength to maintain a desired structural integrity as they are rolled, unrolled, directed to an application station, and applied to a web with adhesive or heat. Conventional polymer films of less than about 12 microns thickness will often tear, break, or stretch when rolled or unrolled. The method and system of the present invention allows the application of significantly thinner polymer film layers 10 on a mat than has been possible in the past. Such thin films nevertheless provide moisture resistance equal to that provided by thicker films and so costs are decreased accordingly. Thicker films also are possible, as discussed above.

According to some embodiments, the polymer extruded onto the mat is polypropylene or polyethylene. However, it will be apparent to one of ordinary skill in the art that other materials, such as other suitable polymers and polymer blends may also be used without departing from the scope of this invention. Any extrudable polymer, polymer blend, or other material can be used with the system and method of the present invention, so long as the material has suitable physical properties. Examples include, without limitation, polyethylene, polypropylene, polyvinyl chloride (PVC), Nylon, Polyester, and all polyolefins. The invention illustrated herein is intended to encompass films created from any polymer capable of being extruded onto a mat in the form of a thin film. "Film" might also include a thin layer of an organic material such as asphalt or a layer of adhesive or a web of any other material that is to be used as or in a construction product.

A composite mat formed by the process of this invention may have uses as a product in its own right such as, for example, a construction or shipping wrap or a roofing underlayment. The composite mat also may be incorporated into or form the foundation of other products. For instance, the composite mat may be substituted for the traditional asphalt-saturated substrate in the manufacture of asphalt shingles. This eliminates the step of pre-saturating a mat with asphalt to form a moisture barrier as well as eliminating the additional asphalt required, reducing the weight of the resulting shingle, and increasing its flexibility.

When using the composite mat of this invention as an asphalt shingle substrate, it is necessary that the composite mat 45 be suitable for the application of hot asphalt to the non-sealed side of the composite mat; i.e., the side opposite the polymer coating. In typical shingle manufacturing, hot asphalt in the temperature range of 350°–450° F. is applied to a substrate for 5-15 minutes during the fabrication of a composite asphalt shingle. When the substrate is an asphalt saturated web, this presents no problems. However, when using a composite mat according to this invention as a substrate, some of the heat from the hot asphalt will transfer to the polymer film 10 previously extruded onto the opposite side of the substrate material. It is therefore necessary that the process and materials be controlled so that the polymer film will withstand the heat without re-liquefying. At temperatures much higher than about 450° F. most polymers will begin to liquefy or at least become malleable. Thus, when manufacturing asphalt shingles using the composite mat of this invention as a substrate, hot asphalt at a temperature of about 400° F. is preferred. Further, an appropriate higher melting point polymer such as, for example, polypropylene, polyethylene, or any other suitable polymer that can withstand such temperatures for 15 minutes or more should be selected for the polymer film coating 10.

The composite mat of this invention also may be used as a foundation in other products used in the roofing industry. For instance, a water resistant underlayment may be formed by first applying a thin layer of tacky material to the non-sealed side of a composite mat made according to the present invention. The tacky material may be asphalt, a polymer modified asphalt, a contact adhesive, or another appropriate material. A peel-away release layer can then be applied to the tacky material as protection. When applying such an underlayment in the field, the release layer can be removed and the mat applied to a roof deck with the tacky side down. The tacky material sticks to the roof deck to hold the underlayment in place. The polymer film on the now exposed side of the web provides a moisture resistant barrier beneath shingles or other roofing products subsequently installed on the roof. Furthermore, it has been discovered quite surprisingly that the exposed polymer film provides exceedingly good slip resistance. This allows installers to walk confidently on the underlayment during installation with less chance of slipping and falling.

Figure 2:
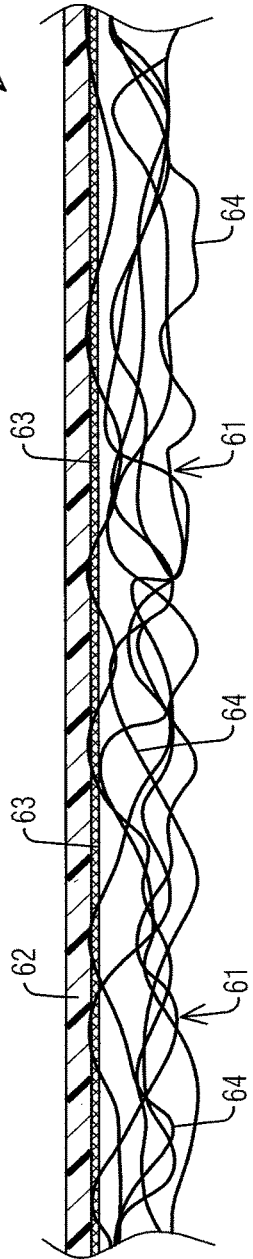
FIG. 2 is an exaggerated cross-section of a polymer coated mat according to principles of the invention

FIG. 2 is an exaggerated cross-section of a composite mat onto which a thin film of polymer has been extruded according to principles of the present invention. The composite mat 60 includes a substrate mat 61, which may be a non-woven fiberglass mat made of a plurality of randomly oriented glass fibers 64 bound in a non-woven matrix with appropriate binders. Mats made of organic felt and other materials also may be used and fall within the scope of the invention. A thin film 62 of polymer is extruded onto the upper surface of the mat 61. The thickness of the film may be between about 2 microns and about 10 microns. As described above, the process of extruding molten polymer onto the hot surface of the mat 61 bonds the two together into a unitary structure, as indicated by the bonded interface 63 in FIG. 2. Thus, the polymer film forms a moisture barrier and renders the composite mat advantageous for direct uses and for use in other products such as underlayments and shingles.

Figure 3:
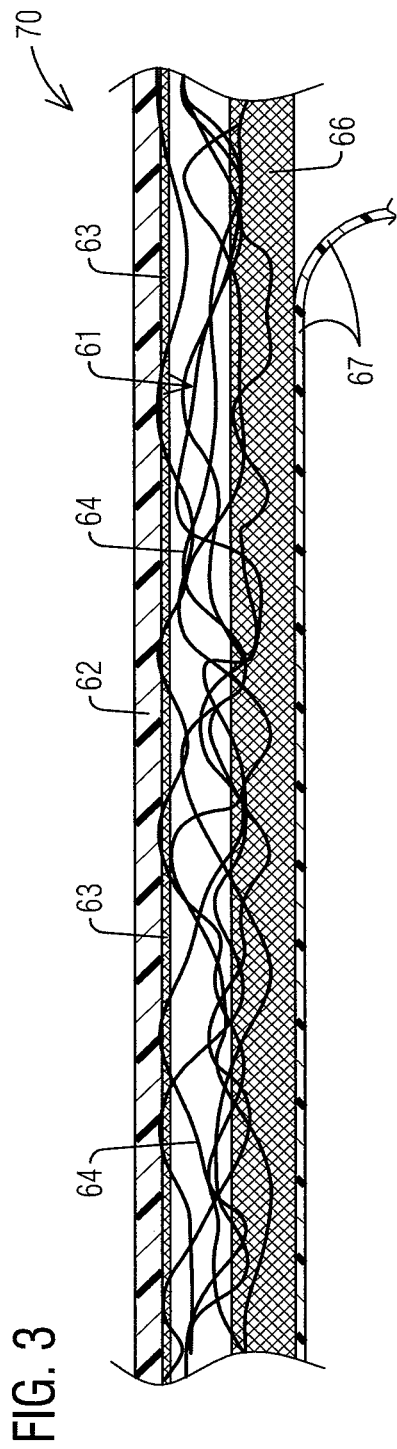
FIG. 3 is an exaggerated cross-section of a roofing underlayment that incorporates the polymer coated mat of FIG. 2.

FIG. 3 is an exaggerated cross-section of an underlayment product that incorporates a composite mat of the present invention as a foundation. The underlayment 70 includes the composite mat 60 of FIG. 2 having a substrate mat 61 with a thin polymer film 62 bonded to its upper surface. The bottom surface of the composite mat is coated in this product with a sticky or tacky material 66. The material 66 may be any material with sufficient stickiness to adhere to a roof deck, but preferably is asphalt or modified asphalt blend that exhibits high adhesion properties. A release layer 67 of material such as thin cellophane or other polymer covers the material 66 and protects its sticky surface until installation on a roof. During installation, the release layer is peeled away and the underlayment is rolled out onto a roof deck with its sticky material 66 adhering to the deck. As mentioned above, this forms a reliable moisture resistant barrier beneath shingles. An added advantage is that the polymer film on top of the underlayment is highly slip resistant, allowing installers to walk with confidence on the underlayment as it is installed.

Figure 4:
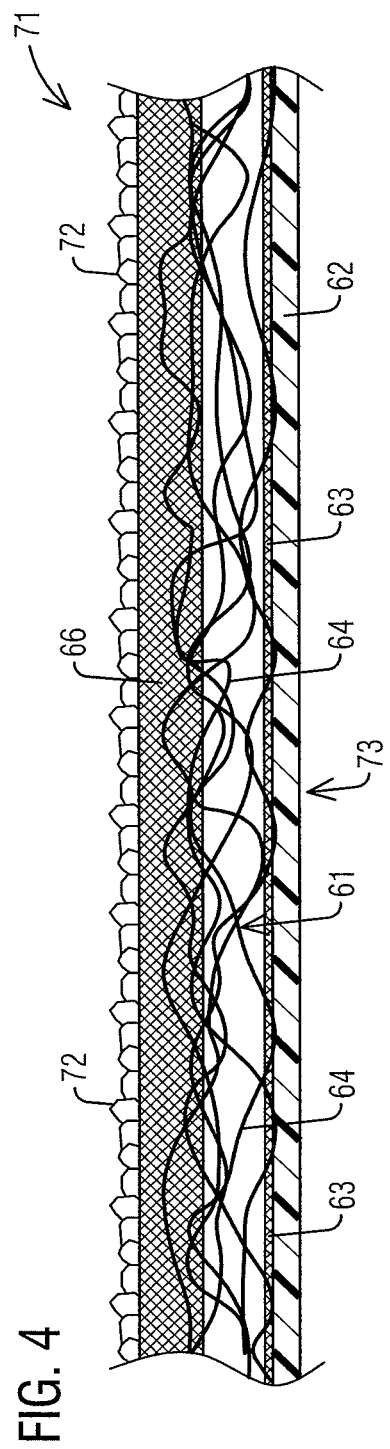
FIG. 4 is an exaggerated cross-section of an asphalt roofing shingle that incorporates the polymer coated mat of FIG. 2.

FIG. 4 is an exaggerated cross-section of an asphalt shingle that incorporates a composite mat of the present invention. The shingle 71 incorporates the composite mat as its bottom surface 73. As before, the composite mat includes a substrate mat 61 made of non-woven randomly oriented and bonded fibers 64. A thin polymer film 62 has been extruded onto the mat 61 as described above and is bonded thereto within a bonding zone 63. Unlike traditional asphalt shingles, the mat is not saturated with asphalt because the polymer film extruded onto its bottom side provides the moisture barrier that traditionally is provided by saturating the mat with asphalt. A layer of asphalt is applied and bonded to the upper side of the composite mat as in traditional shingles. Ceramic granules are embedded in and cover the top surface of the asphalt layer to protect the asphalt from UV rays and the environment.

The novel asphalt shingle 71 of FIG. 4 provides numerous advantages over traditional asphalt shingle constructions. The amount of asphalt used in the manufacture of the shingle 71 is significantly reduced because the traditional processing step of pre-saturating the substrate mat is eliminated. The shingle 71 also is significantly lighter than traditional shingles, and thus less expensive to ship and easier for installers to handle. In addition, the polymer film coated on the bottom of the shingle 71 does not tend to stick to an underlying shingle in a bundle during storage and shipping. Thus, the traditional step of backdusting shingles to prevent sticking before the shingles are bundled may be eliminated. The shingle 71 is installed in the same manner as traditional asphalt shingles, but because of its lower weight, the process of carrying bundles to a roof and installing the shingles is less labor intensive.

The invention of this disclosure thus encompasses a method or process for fabricating a polymer coated composite mat 45. The invention also encompasses the resulting composite mat itself, which is characterized by the porous, non-woven substrate mat 5 sealed on one or both sides by a thin polymer film 10. Construction products incorporating the composite mat and methods of fabricating such products also are encompassed by the invention. Exemplary products include a moisture resistant construction wrap, a roofing underlayment, and a novel and improved asphalt shingle incorporating the composite mat in lieu of an asphalt saturated fiberglass mat.

The foregoing description illustrates and describes various embodiments. It will be understood by the skilled artisan that a wide range of additions, deletions, and modifications, both subtle and gross, might be made to the exemplary embodiments without departing from the scope of the invention. It is intended that all matter contained in the above description or shown in the accompanying drawings shall be interpreted as illustrative and not in a limiting sense. Additionally, the disclosure shows and describes only selected embodiments of the invention, but the invention is capable of use in various other combinations, modifications, and environments and is capable of changes or modifications within the scope of the inventive concept expressed herein, commensurate with the above teachings, and/or within the skill or knowledge of the relevant art. Furthermore, certain features and characteristics of each embodiment may be selectively interchanged and applied to other illustrated and non-illustrated embodiments of the invention. Accordingly, the scope of the invention illustrated above with exemplary embodiments is limited only by the claims hereof.

What is claimed is:

1. A method comprising the steps of:
conveying a fiberglass mat in a downstream direction along a processing path;
heating the fiberglass mat to a predetermined temperature to form a heated fiberglass mat;
extruding a layer of molten polymer directly onto the heated fiberglass mat while the polymer is still molten to form a molten polymer film on at least one surface of the heated fiberglass mat;
allowing the molten polymer film to bond to the heated fiberglass mat to form a composite mat;
cooling the composite mat to sufficiently solidify the molten polymer film to form a flat film of polymer such that: (i) the flat film forms a moisture barrier on the surface of the heated fiberglass mat, and (ii) the flat film does not stick when the composite mat is wound into a roll;
wherein cooling the composite mat comprises contacting the composite mat with at least one chilled roller, at least one chilled air blower, or a combination thereof; and
collecting the composite mat;
wherein the composite mat comprises a moisture resistant construction product.

2. A method as claimed in claim 1 wherein the step of heating the fiberglass mat comprises passing the fiberglass mat through an oven.

3. A method as claimed in claim 1 wherein the step of extruding a layer of molten polymer directly onto the heated fiberglass mat comprises positioning a die adjacent the surface of the heated fiberglass mat and ejecting molten polymer through the die directly onto the heated fiberglass mat.

4. A method as claimed in claim 3 wherein the die is a slot die.

5. A method as claimed in claim 3 further comprising the step of delivering polymer to the die through an extruder and melting the polymer as it moves through the extruder.

6. A method as claimed in claim 5 further comprising the step of delivering the polymer to the extruder in the form of pellets that are subsequently melted as they are conveyed through the extruder.

7. A method as claimed in claim 1 wherein the step of allowing the film of molten polymer to bond to the heated-fiberglass mat comprises allowing the film of molten polymer to remain in contact with the heated fiberglass mat for a predetermined length of time until the polymer begins to cool and cure.

8. A method as claimed in claim 1 further comprising passing the composite mat over at least one chilled roller and passing the composite mat under at least one chilled roller.

9. A method as claimed in claim 1 further comprising controlling the rate of extrusion of molten polymer relative to the speed at which the fiberglass mat is conveyed to extrude a layer of molten polymer of a predetermined thickness onto the fiberglass mat.

10. A method as claimed in claim 9 wherein the predetermined thickness is less than about 12 microns.

11. A method as claimed in claim 10 wherein the predetermined thickness is between about 3 microns and about 10 microns.

12. A method as claimed in claim 11 wherein the predetermined thickness is between about 5 microns and about 6 microns.

* * * * *